US012502752B2

(12) United States Patent
Carter

(10) Patent No.: US 12,502,752 B2
(45) Date of Patent: Dec. 23, 2025

(54) CENTERING SUPPORT PLANE SCREWDRIVER

(71) Applicant: Lee Patrick Carter, Minneapolis, MN (US)

(72) Inventor: Lee Patrick Carter, Minneapolis, MN (US)

( * ) Notice: Subject to any disclaimer, the term of this patent is extended or adjusted under 35 U.S.C. 154(b) by 604 days.

(21) Appl. No.: 17/725,406

(22) Filed: Apr. 20, 2022

(65) Prior Publication Data

US 2023/0339079 A1 Oct. 26, 2023
US 2024/0253189 A9 Aug. 1, 2024

Related U.S. Application Data

(60) Provisional application No. 63/169,051, filed on Mar. 31, 2021.

(51) Int. Cl.
*B25B 15/00* (2006.01)
*B25B 23/10* (2006.01)

(52) U.S. Cl.
CPC .......... *B25B 15/007* (2013.01); *B25B 23/105* (2013.01)

(58) Field of Classification Search
CPC . B25B 15/007; B25B 23/0035; B25B 23/105; B25B 23/101
USPC .......................................... 81/436, 464, 456
See application file for complete search history.

(56) References Cited

U.S. PATENT DOCUMENTS 2,698,637 A 1/1955 Donovan
3,044,513 A * 7/1962 Barany ................. B25B 15/007 D8/387
3,288,185 A 11/1966 Clark
3,361,169 A 1/1968 Charchenko
3,517,714 A 6/1970 Desbarats
3,604,488 A 9/1971 Wishart
3,707,894 A * 1/1973 Stillwagon, Jr. ........ B25B 23/12 81/125
3,739,825 A 6/1973 Knox
4,229,999 A * 10/1980 Rottigni .................. B25B 27/24 7/138
5,009,133 A 4/1991 Carey
D339,278 S 9/1993 Rainey
D395,214 S * 6/1998 Murphy, Jr. ..................... D8/21
5,950,508 A * 9/1999 Rossi ...................... B25B 13/06 81/451

(Continued)

*Primary Examiner* — Hadi Shakeri

(74) *Attorney, Agent, or Firm* — Barry L. Davison.; Davis Wright Tremaine LLP

(57) ABSTRACT

Provided are centering, support plane screwdrivers comprising: a retention housing having a top portion with an upper support surface having an outer perimeter and surrounding a central walled recess extending below the support surface, the recess configured to center and receive a screw head, or portion thereof, therein; an optional lip at the support surface perimeter; and a turning face on the retention housing for application of a torquing force. Additionally provided are centering, support plane screwdrivers comprising: a retention housing having a top portion with an upper support surface having an outer perimeter and surrounding a central screwdriver tip extending above the support surface; a lip positioned at the support surface perimeter; and a turning face on the retention housing. Methods for removing or installing a screw assembly (e.g., an espresso machine shower screen assembly) using the screwdrivers are also provided.

13 Claims, 5 Drawing Sheets

(56) References Cited

U.S. PATENT DOCUMENTS

| | | | | |
|---|---|---|---|---|
| 6,138,538 | A * | 10/2000 | Neijndorff | B25B 23/005<br>81/DIG. 11 |
| 7,077,037 | B2 * | 7/2006 | Shevela | B25B 13/06<br>81/436 |
| D784,099 | S | 4/2017 | Mitchell | |
| 9,833,887 | B1 * | 12/2017 | Liu | B25B 21/00 |
| D950,332 | S | 5/2022 | Chou | |
| 2002/0178872 | A1 | 12/2002 | Ferrantelli | |
| 2014/0060267 | A1 * | 3/2014 | Coton | B25B 23/12<br>81/451 |
| 2015/0040729 | A1 | 2/2015 | Ou | |
| 2015/0258666 | A1 | 9/2015 | Yeh | |
| 2018/0291519 | A1 | 10/2018 | Liu | |

* cited by examiner

CENTERING SUPPORT PLANE SCREWDRIVER

FIELD OF THE INVENTION

Aspects of the invention relate generally to tools, more particularly to mechanical tools for installing and removing assembly screws (e.g., screws with a collar, such as a washer or spacer), and even more particularly to tools configured with a centering support platform/plane to provide for rapid, safe removal and/or installation of assembly screws and collars (e.g., shower screen plus shower screen screw of an espresso machine).

BACKGROUND

Traditional espresso coffee machines comprise a dispenser assembly having an empty body that is internally provided with a lower circular mouth configured to receive and support a filter holder. The filter holder is typically coupled with the mouth using a traditional bayonet coupling, wherein radial tabs externally positioned on the body of the filter holder are slidably received inside annular slots within the mouth of the dispenser assembly.

The filter holder comprises a handle to facilitate manual operations made by an operator to repeatedly couple and uncouple the filter holder to and from the dispenser assembly each time coffee is prepared. The body of the filter holder contains a filter, typically consisting of a tub configured to receive a compact dose of coffee powder. The bottom of the tub typically comprises a dense set of small holes configured to retain the coffee powder while providing passage of liquid coffee extract therethrough, for subsequent dispensing out of the filter holder through one or more dispensing nozzles extending from under the body of the filter holder, and into one or more receiving cups.

The lower circular mouth of the dispenser assembly houses a shower screen provided with a grid of apertures sufficiently dense for preventing ascending flow of the coffee powder contained in the filter holder to enter the dispenser assembly when the filter holder is coupled in the mouth of the dispenser assembly. The shower screen, typically a perforated sheet metal disk, thus acts as a filtering partition between the water circuit upstream of the dispenser assembly and that of the filter holder. The shower screen is typically attached to the dispenser assembly by one or more fixing screws, extending upward through one or more respective holes in the shower screen, being received for tightening into one or more respective threaded seats within the lower mouth of the dispenser assembly.

The shower screen must typically be removed by an operator at least daily for cleaning, necessitating removal and reinstallation of the fixing screw(s) from the dispenser assembly. The distance between the dispenser assembly and the receiving cups is limited for practical reasons, such that even when the filter holder is removed, visualization of, and access to the shower screen and fixing screw(s) is limited and constrained, thereby impeding facile, optimal engagement/actuation of the fixing screw(s) using a traditional tool (e.g., screwdriver or Allen key). The fixing screw removal/reinstallation process is, therefore, not only awkward and time-consuming, but also exposes the operator to potential burns from contact with the dispenser assembly (typically at temperatures of about 100° C.), and further results in progressive damage to the fixing screw head (e.g., stripping of the screw head actuation slots) and/or to the shower screen itself due to misalignment or slippage of the tool (e.g., screwdriver or Allen key).

There is, therefore, a pronounced need in the art for tools that provide for more rapid, facile and safe removal of assembly screws, such as shower screen retaining screws, while also maintaining the integrity of the retaining screw and collar (e.g., shower screen). Aspects of the present invention provide a solution to a least these long-standing problems.

BRIEF DESCRIPTION OF THE DRAWINGS

FIGS. 4A and 48, show perspective views of an alternative embodiment of the screw head-engaging blade insert 112 of the screwdriver of FIG. 2B having an upper blade edge 112A with a central raised blade section 112C.

SUMMARY OF EXEMPLARY EMBODIMENTS OF THE INVENTION

Figure 1A:
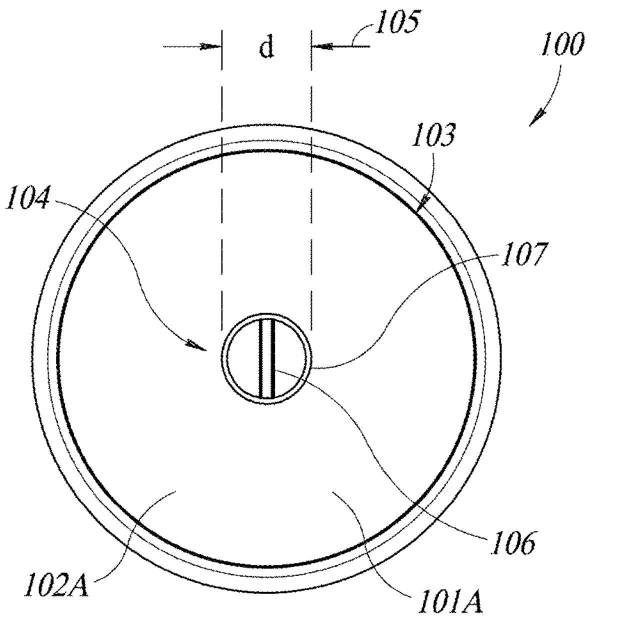
FIGS. 1A-1D show, by way of non-limiting examples of the present invention, top (FIG. 1A), bottom (FIG. 1B), perspective (FIG. 1C) and side (FIG. 1D) views of a first exemplary embodiment of the centering support platform/plane screwdriver 100 of the present invention.
Figure 1B:
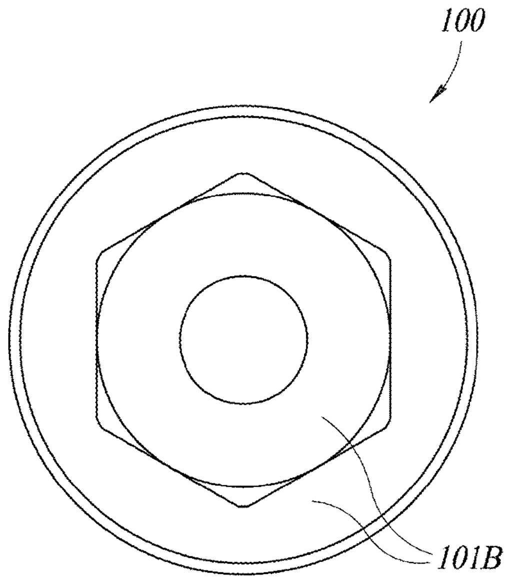

Provided is a centering, support plane screwdriver comprising: a retention housing having a top portion with an upper support surface having an outer perimeter and surrounding a central walled recess extending below the support surface, the recess configured to center and receive a screw head, or portion thereof, therein; an optional lip at the support surface perimeter; and a turning face on the retention housing, and configured to be in turning communication therewith upon application of a torquing force. The recess may comprise an integral or non-integral screwdriver tip centered in the walled recess, and wherein the recess margin, walled recess, and screwdriver tip are configured to center, receive and engage a screw head, or a screwdriver tip engaging portion thereof, within the recess.

Additionally provided is a centering, support plane screwdriver comprising: a retention housing having a top portion with an upper support surface having an outer perimeter and surrounding a central screwdriver tip extending above the support surface; a lip positioned at the support surface perimeter; and a turning face on the retention housing, wherein the support surface and the circumferential lip are configured to sufficiently conform to an assembly screw collar (e.g., to the outer circumference of an espresso machine shower screen) to center, receive and support the collar (e.g, a shower screen) on the support surface, and to cooperate with the screwdriver tip to center and engage a screw head (e.g., shower screen screw head), or a portion thereof. Additionally provided are methods for removing or installing a screw assembly (e.g., an espresso machine shower screen assembly) using the centering, support plane screwdrivers.

Embodiments of the disclosure can be described in view of the following clauses:

1. A centering, support plane screwdriver, comprising: a retention housing having a base portion connected to a top housing portion having an upper planar or substantially planar support surface defined by an outer perimeter and surrounding a central cylindrical walled recess extending into the top housing portion from a circular recess margin at the support surface to a level below the support surface, the recess margin and walled recess configured to center and receive a screw head, or a portion thereof within the walled recess; and an exterior turning face positioned on the retention housing, and configured to be in turning communication therewith upon application of a torquing force to the turning face.
2. The screwdriver of clause 1, wherein the recess comprises an integral or non-integral screwdriver tip centered in the walled recess, and wherein the recess margin, walled recess, and screwdriver tip are configured to center, receive, and engage a screw head, or a screwdriver tip engaging portion thereof, within the recess.
3. The screwdriver of clause 2, wherein the screwdriver tip is positioned within the walled recess to be flush with or below the support surface level.
4. The screwdriver of clause 2 or 3, wherein the screwdriver tip is selected from the group consisting of flathead, Philips (cross-head), Pozidriv, square, torx, Frearson, and Robertson.
5. The screwdriver of any one of clauses 2-4, wherein the screwdriver tip is that of a removable bit.
6. The screwdriver of any one of clauses 2-5, wherein the screwdriver tip is magnetic.
7. The screwdriver of any one of clauses 1-6, wherein the perimeter of the support surface is circular, and the support surface extends radially or substantially radially from the recess margin to the support surface perimeter.
8. The screwdriver of any one of clauses 1-7, wherein the walled recess is integral with the top housing portion and support surface.
9. The screwdriver of any one of clauses 1-8, wherein the top housing portion is a disk having upper and lower disk surfaces, wherein the upper disk surface is the support surface, the lower disk surface is in contact with, and/or connected to the base housing portion, and wherein the exterior turning face is connected to or integral with the base housing portion.
10. The screwdriver of clause 9, wherein the walled recess extends partially or completely through the support disk.
11. The screwdriver of any one of clauses 1-10, wherein the recess margin is beveled to a larger diameter d at the support surface.
12. The screwdriver of any one of clauses 1-11, wherein the cylindrical wall of the walled recess has a pair of opposed vertical slots extending perpendicularly from a support surface-proximal position below the support surface to a support surface-distal position.
13. The screwdriver of clause 12, wherein the recess margin is beveled, and wherein the support surface proximal positions of the vertical slots are within the bevel below the support surface level.
14. The screwdriver of clause 12 or 13, wherein the screwdriver tip comprises at least an upper edge portion of a screw head-engaging insert extending between and into the opposed vertical slots in the cylindrical wall of the recess.
15. The screwdriver of clause 14, wherein the walled recess extends partially through the support disk to a recess bottom having a recess bottom slot extending between the opposed vertical slots, to provide a U-shaped slot within the galled recess of the top housing portion.
16. The screwdriver of clause 15, wherein the screw head-engaging insert also extends into or through the recess bottom slot.
17. The screwdriver of clause 15 or 16, wherein a lower edge of the screw head-engaging insert additionally extends into a conforming slot in the base housing portion.
18. The screwdriver of any one of clauses 1-17, further comprising a circumferential lip positioned at the perimeter of the support surface and extending perpendicularly or substantially perpendicularly beyond the support surface in a direction opposite the cylindrical walled recess to define a recessed support surface, and wherein the circumferential lip is integral or non-integral with the top and/or base housing portions.
19. The screwdriver of clause 18, wherein the support surface and the circumferential lip are configured to sufficiently conform to the outer circumference of a screw collar (e.g., an espresso machine shower screen) to cooperate with the recess margin and walled recess to center, receive, and support a screw head (e.g., shower screen screw head), or a portion thereof within the walled recess, and to center, receive, and support a screw collar (e.g., a shower screen) on the support surface,
20. The screwdriver of clause 19, wherein the circumferential lip is integral with the base housing portion.
21. The screwdriver of clause 19, wherein the circumferential lip is integral with the top housing portion.
22. The screwdriver of any one of clauses 2-21, wherein screwdriver tip is, or comprises a flat head or cross-head tip suitable to engage a conforming screw head or portion thereof.
23. The screwdriver of any one of clauses 1-22, wherein the exterior turning face is multi-faceted (e.g., square, triangular, hexagonal, ribbed, etched, etc.).
24. The screwdriver of any one of clauses 2-23, wherein the support surface and the circumferential lip are configured to sufficiently conform to the outer circumference of an espresso machine shower screen to cooperate with the recess margin, walled recess, and screwdriver tip to center, receive, and engage a shower screen screw head, or a portion thereof, within the walled recess, and to center, receive, and support a shower screen on the support surface.
25. A method for installing or removing a shower screen assembly screw and shower screen of an espresso machine, comprising use of the screwdriver of any one of clauses 1-24 to install or remove the screw, while supporting the shower screen on the support surface of the screwdriver.

26. A centering, support plane screwdriver, comprising: a retention housing having a base housing portion connected to a top housing portion having an upper planar or substantially planar support surface defined by an outer perimeter and surrounding a central screwdriver tip that extends at least partially above the support surface and is configured to receive and engage a screw head, or a portion thereof above the support surface; a circumferential lip positioned at the perimeter of the support surface and extending perpendicularly or substantially perpendicularly above the support surface to define a recessed support surface, wherein the support surface and the circumferential lip are configured to sufficiently conform to the outer circumference of a screw collar (e.g., an espresso machine shower screen) to center, receive, and support a screw collar (e.g., a shower screen) on the support surface, and to cooperate with the screwdriver tip to center and engage a screw head (e.g., a shower screen screw head), or a portion thereof, and wherein the circumferential lip is integral or non-integral with the top and/or base housing portions; and an exterior turning face positioned on the retention housing, and configured to be in turning communication therewith upon application of a torquing force to the turning face.
27. The screwdriver of clause 26, wherein the screwdriver tip is selected from the group consisting of flathead, Philips (cross-head), Pozidriv, square, torx, Frearson, and Robertson.
28. The screwdriver of clause 26 or 27, wherein the screwdriver tip is integral with the top housing portion, or is that of a removable bit.
29. The screwdriver of any one of clauses 26-28, wherein the screwdriver tip is magnetic.
30. The screwdriver of any one of clauses 26-29, wherein the top housing portion is a disk having upper and lower disk surfaces, wherein the upper disk surface is the support surface, the lower disk surface is in contact with, and/or connected to the base housing portion, and wherein the exterior turning face is connected to or integral with the base housing portion.
31. The screwdriver of any one of clauses 26-30, wherein the circumferential lip is integral with the base housing portion.
32. The screwdriver of any one of clauses 26-31, wherein the circumferential lip is integral with the top housing portion.
33. The screwdriver of any one of clauses 26-32, wherein screwdriver tip is, or comprises a flat head or cross-head tip suitable to engage a conforming screw head or portion thereof.
34. The screwdriver of any one of clauses 26-33, wherein the exterior turning face is multi-faceted (e.g., square, triangular, hexagonal, ribbed, etched, etc.).
35. A method for installing or removing a shower screen assembly screw and shower screen of an espresso machine, comprising use of the screwdriver of any one of clauses 26-34 to install or remove the screw, while supporting the shower screen on the support surface of the screwdriver.

DETAILED DESCRIPTION OF EXEMPLARY EMBODIMENTS

The following description is provided for illustrative purposes to demonstrate exemplary embodiments of the invention, and are not intended to limit the scope of the inventive devices, methods, and applications.

Aspects of the invention remedy drawbacks of the prior art, by providing a tool for quick, easy, mechanically safe and painless removal of assembly screws (e.g., a shower screen and shower screen assembly screw of an espresso coffee machine) that can be mounted and dismounted in a rapid, simple way, without damaging the assembly or screw (e.g., without damaging the shower screen or shower screen screw from tool slippage, and without exposing the user to risk of harmful contact with hot water and/or hot shower screen assembly parts).

"Screw assembly" as used herein, refers to an assembly screw having an assembly screw collar mounted on the shank of the assembly screw against the screw head, and held in place by the screw head in an assembled screw assembly. In aspects of the disclosed centering, support plane screwdrivers, the support surface and the circumferential lip positioned at the perimeter of the support surface are configured to sufficiently conform to the outer circumference of a screw collar to center, receive and support the collar during installing or removing the screw assembly. In preferred embodiments a screw assembly refers to an espresso machine shower screen assembly, comprising a shower screen (as the collar) mounted on a shower screen screw (assembly screw).

"Assembly screw collar" as referred to herein, means a collar (e.g., washer, spacer, screen, etc.) mountable at least partially around the shank of an assembly screw against the screw head, and held in place by the screw head in an assembled screw assembly. In preferred embodiments, an assembly screw collar refers to a shower screen of an espresso machine, mountable on a shower screen assembly screw.

FIGS. 1A-1D show top (1A), bottom (1B), perspective (1C) and side (1D) views of a first exemplary embodiment of the centering, support platform/plane screwdriver 100 of the present invention.

With reference to FIGS. 1A-1D, the screwdriver comprises a housing 101 having a base (bottom) housing portion 101B, and a top housing portion 101A with an upper planar or substantially planar support surface 102A having an outer perimeter 103 and surrounding a central cylindrical walled recess 104 having a recess diameter ("d") 105 extending below the level of the support surface 102A. The cylindrical walled recess 104 is defined at the support surface 102A level by a circular edge or margin 107 (beveled in this embodiment), and the margin 107 and the recess 104 are configured to center, receive and engage a screw head (not shown), or a slotted portion of a screw head, therein. In this embodiment, the perimeter 103 is circular, and the support surface 102A extends radially or substantially radially from the margin 107 of the recess 104. The recess 104 in this embodiment contains a non-integral screwdriver head/tip/blade 106. Alternately, the screwdriver tip 106 may be integral with the walled recess 104. The screwdriver tip 106 is positioned, in this embodiment, slightly below the support surface level 102A (in this instance, positioned at a level within the bevel of the beveled margin 107), such that the margin 107, the recess 104, and screwdriver tip 106 may center, receive and engage, respectively, a screw head (e.g., domed, flat, etc.), or at least a screwdriver tip 106-engaging (e.g., slotted) portion of a screw head within the recess 104. Alternatively, the margin 107 may not be beveled, and/or the screwdriver tip 106 may optionally be flush or slightly above the support surface level 102A, as long as the margin 107, recess diameter d 105, and the position of the screwdriver tip 106 relative to the margin 107 are coordinately configured to provide for centering of an engaged screw head, or screwdriver tip 106-engaging (e.g., slotted) portion thereof, within the margin 107 and recess 104, during operation of the device. The screwdriver tip 106 may be of any type (e.g., flathead, Philips (cross-head), Pozidriv, square, torx, Frearson, Robertson, etc.) depending on the type of screw head to be engaged. In embodiments where the screwdriver tip 106 is non-integral with the walled recess 104, it may be removable or non-removable, and may optionally communicate with the walled recess 104 via a ratchet (gear and pawl) configured to receive and engage the screwdriver tip 106. The screwdriver tip 106, and/or the walled recess 104 or a portion thereof, and/or the support surface 102A, may be magnetic. The circular margin 107 of the walled recess 104 may be beveled as in this example, or non-beveled in which case the margin 107 diameter will equal the recess diameter (d) 105 throughout the recess depth. When the margin 107 is beveled, the recess diameter (d) 105 increases across the bevel to maximum value at the support surface 102A.

In this embodiment 100, the base housing portion 101B comprises one or more integral exterior turning face(s) 108 configured to facilitate rotation of the base housing portion 101B upon application of a torquing force to the turning face(s) 108. In this embodiment 100, the turning face 108 is of a hexagonal form, but alternatively may take any suitable form that provides for transmission of a torquing force to the base housing portion 101B. The turning face(s) 108 may be integral with the base housing portion 101A, or non-integral.

The top housing portion 101A, and thus the support surface 102A thereof, may be integral or non-integral with the base hosing portion 101B, and if non-integral is nonetheless connected to the base housing portion 101B to be in turning communication therewith upon application of a torquing force to the turning face(s) 108. Likewise, the cylindrical recess 104 and/or screwdriver tip 106 may be integral or non-integral with the top housing portion 101A, and if non-integral are nonetheless connected to the top housing portion 101A and/or to the base housing portion 1018, to be in turning communication with the housing 101 upon application of a torquing force to the turning face(s) 108. In this embodiment 100, the cylindrical walled recess 104 is integral with the top housing portion 101A and support surface 102A.

Figure 1C:
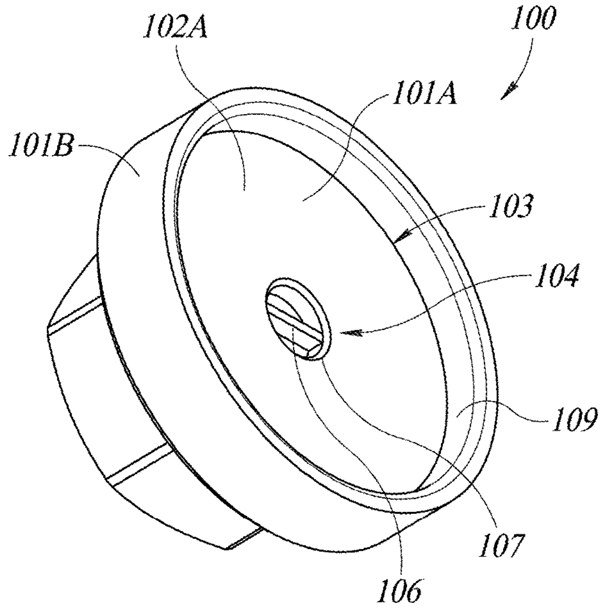
Figure 1D:
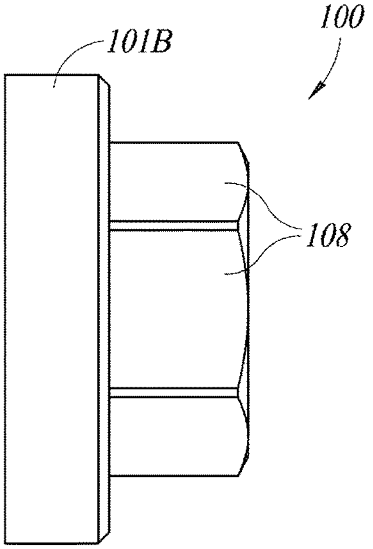

With reference to FIG. 1C, the housing 101 (i.e., the base housing portion 101B in this embodiment) comprises an integral circumferential wall or lip 109 positioned at the outer perimeter 103 of the support surface 102A and extending perpendicularly or substantially perpendicularly beyond the support surface 102A in a direction opposite the cylindrical recess 104 to provide for a recessed support surface 102A. Alternatively, the circumferential lip 109 may be integral with the housing top portion 101B and support surface. Alternatively, the circumferential lip 109 may be integral with top housing portion 101A, or with both housing portions 101A and 101B (e.g., where the top 101A and bottom 101B portions of the retention housing are integral). In this embodiment, the perimeter 103 and depth of the lip 109 is configured to be sufficient to provide a support cup/dish, e.g., for an espresso machine shower screen upon removal of a shower screen assembly screw, but not so deep as to prevent centering, receiving and engaging of the assembly screw by the margin 107, recess 104, and screwdriver tip 106. The lip 109 may be circumferentially continuous or discontinuous (e.g., may have a grooved, slotted, castellated, etc.) form. Regardless of the precise depth or form, perimeter 103 and lip 109 are configured such that lip 109 sufficiently conforms to the outer circumference of, e.g., an espresso machine shower screen, to cooperatively (along with the margin 107, recess 104, and tip 106) provide centering of the screwdriver to receive and engage a screw head, or a screwdriver tip 106-engaging (e.g., slotted) portion thereof within the recess 104.

Figure 2A:
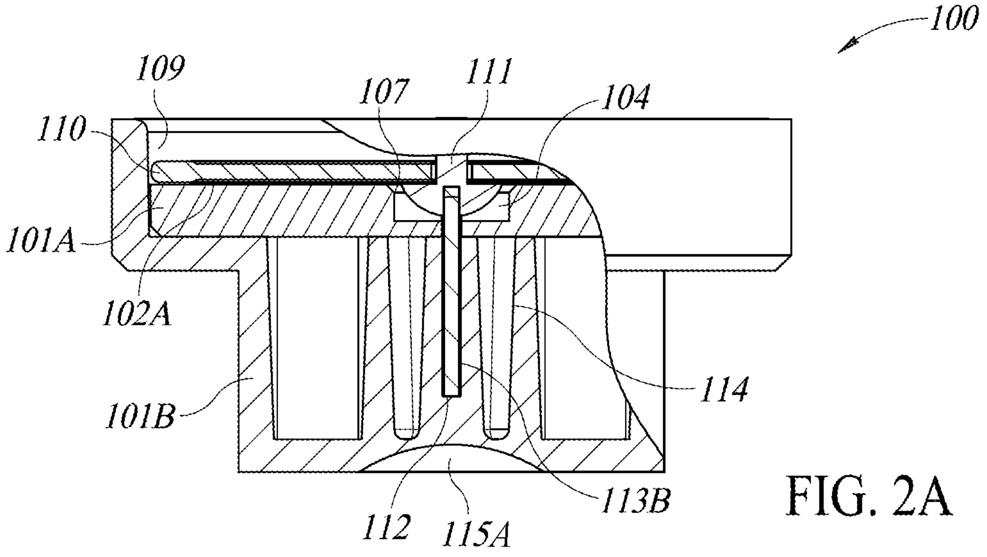
FIGS. 2A and 2B show a cutaway view (FIG. 2A) and a perspective, exploded view (FIG. 2B) of the exemplary embodiment 100 of FIGS. 1A-1D, showing screwdriver 100 supporting a shower screen and a domed shower screen assembly screw after removal, or in preparation for mounting, of the shower screen 110 and screw 111 from/to an espresso machine.
Figure 2B:
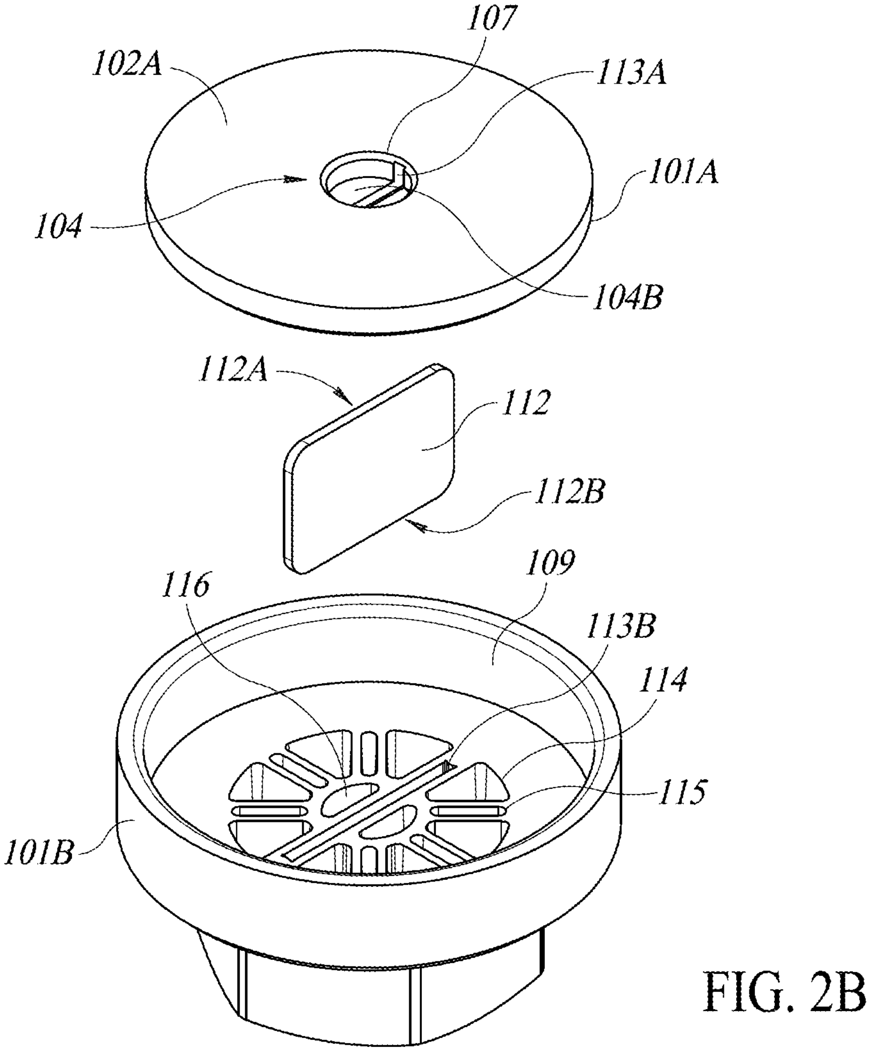
Figure 4A:
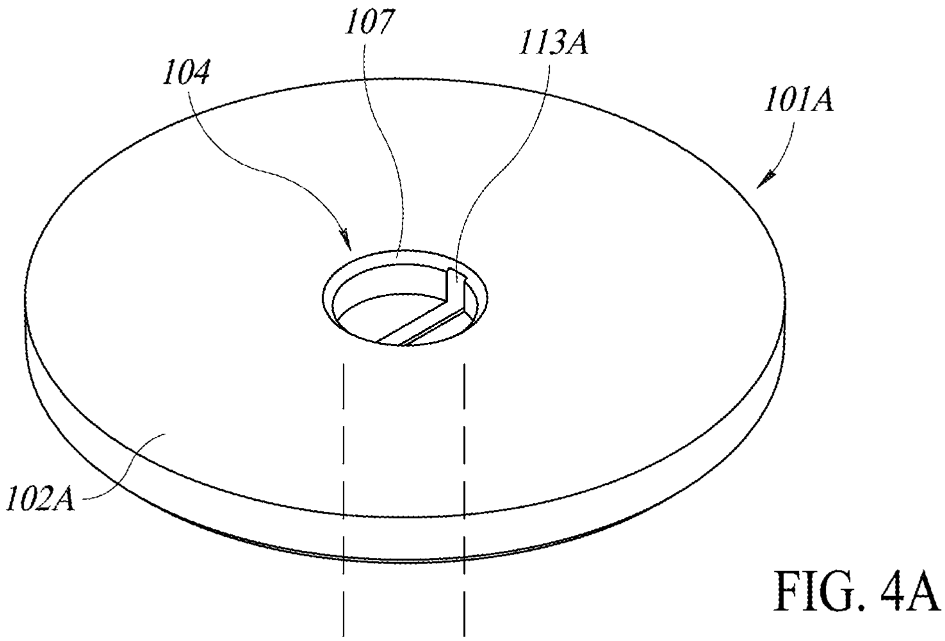
Figure 4B:
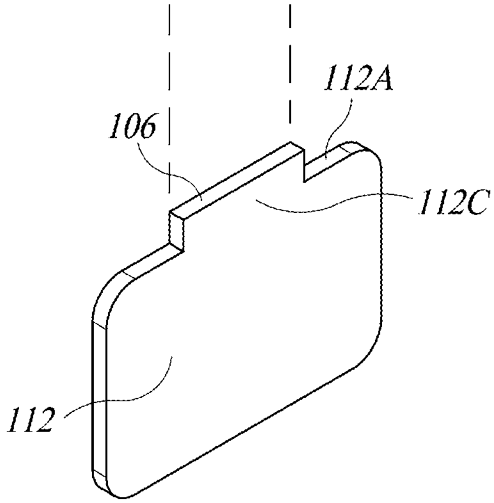

FIGS. 2A and 2B show a cutaway view (FIG. 2A) and a perspective, exploded view (FIG. 2B) of the exemplary embodiment 100 of FIGS. 1A-1D. To illustrate the working of the device, FIG. 2A shows the exemplary centering support plane screwdriver 100 supporting, on the support surface 102A, a shower screen 110 and a shower screen assembly screw 111 (in this instance, domed) after removal of the shower screen 110 and screw 111 from an espresso machine. The slotted head of screw 111 or at least a portion thereof, is centered within the margin 107 and engaged by the screwdriver tip 106 within the cylindrical recess 104, while the shower screen 110 is centered within the circumferential lip 109 and supported on the support surface 102A of top housing portion 101A, illustrating how the margin 107, the circumferential lip 109, and the screwdriver tip 106, provide cooperative centering for installation or removal of the shower screen 110 and screw 111. In this embodiment, the screwdriver tip 106 is at least a portion of the upper edge 112A of a blade 112 (screw head-engaging blade insert). The upper 112A and lower 112B blade edges are inserted into opposed conforming/complementary blade receiving slots 113A and 113B within the top 101A and base 101B housing portions, respectively. In this embodiment, the upper blade edge 112A is flat, having a constant height across the length of the blade, such that the height of upper blade edge 112A in blade receiving slot 113A is the same as the height of the upper blade edge 112A extending across the walled recess 104. Alternatively, as shown in FIG. 4, the upper blade edge 112A may have a central raised blade section 1120 configured to span the walled recess 104, such that the height of the upper blade edge 112A extending across the walled recess 104 may be greater that the height of the upper blade edge 112A within blade receiving slot 113A. In this way, a central raised blade section 112C of the upper blade edge 112A may be configured as a screwdriver tip 106 that extends beyond the support surface 102A, bracketed by adjoining non-raised upper blade edge 112A sections positioned below the support surface in the blade receiving slot 113A.

Optional voids 114, 115, 116 may be formed in the base housing portion 101B to e.g., reduce weight and/or material costs, and/or to aid in manufacturing, etc. The bottom (e.g., bottom center) of the base housing portion 101B is optionally dished 115A, as in this embodiment (see FIG. 2A).

Figure 5A:
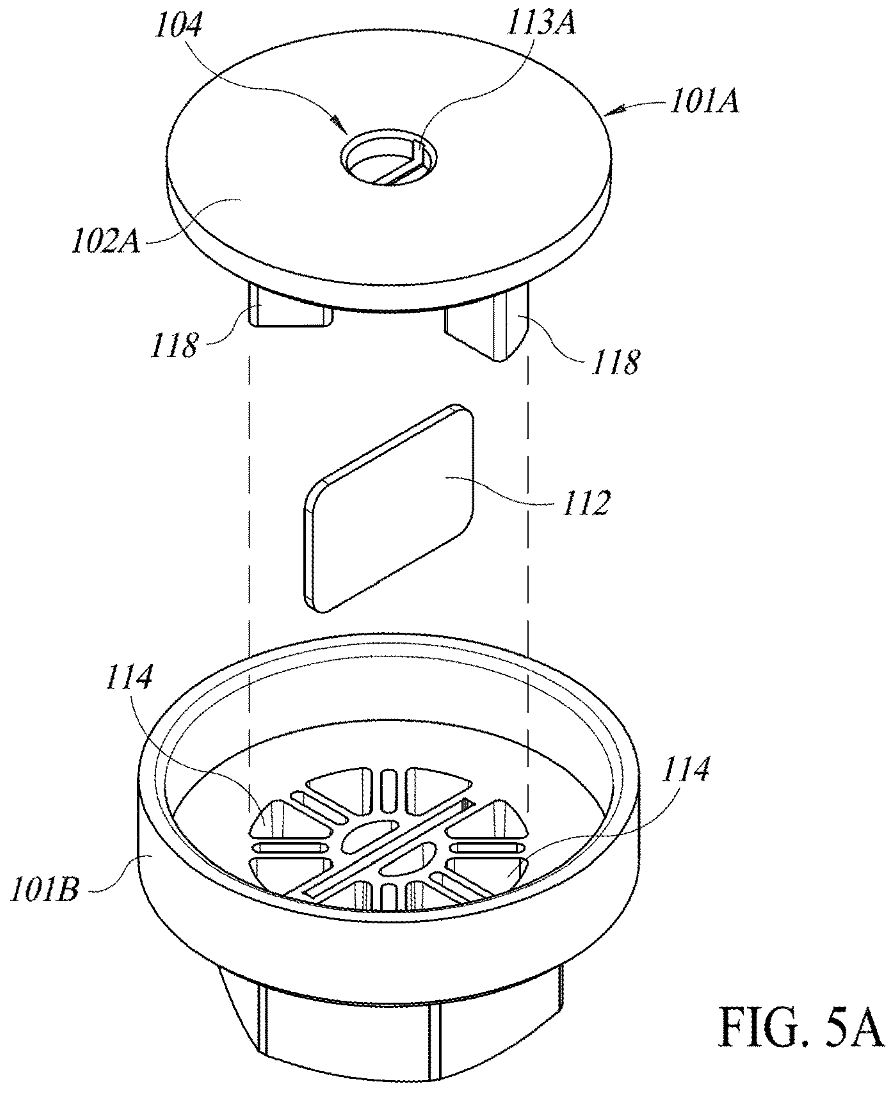
FIG. 5A, shows, by way of a further non-limiting example of the present invention, a perspective view of an alternative embodiment of the top housing portion 101A of the screwdriver of FIG. 2B, having one or more projections 118 configured to reversibly extend into and engage one or more complementary receiving slots (e.g., into one or more of the optional voids 114, 115, 116) of the base housing portion 101B.
Figure 5B:
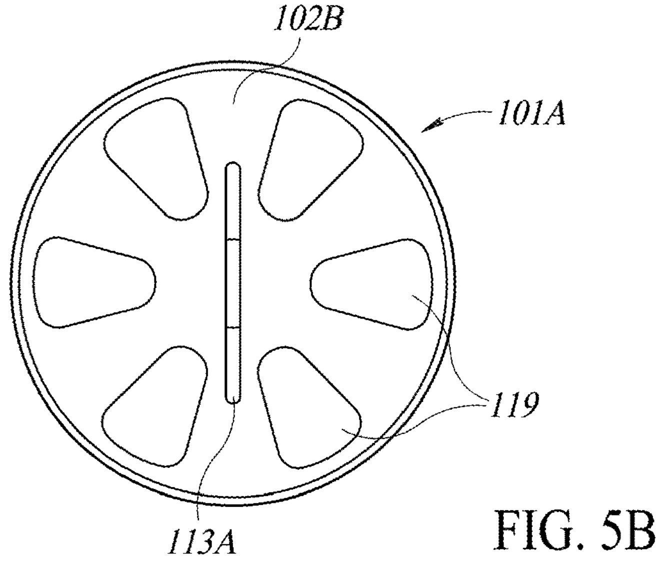
FIG. 5B, shows a bottom view of an alternative embodiment of the top housing portion 101A shown in FIG. 5A, showing six shallow recesses 119, in the bottom surface 102B, instead of projections 118.

As shown in exploded, perspective FIG. 2B, the top housing portion 101A of this embodiment is in the form of a disk, the upper surface of which is the support surface 102A, and wherein the margin 107 of the recess 104 is beveled. The upper and/or lower circumferential edge of the disk may optionally be beveled as in this embodiment, where the lower edge is beveled. The lower edge 112B of blade 112 is received into complementary receiving slot 113B in the base housing portion 101B, while the upper edge 112A of blade 112 is received into opposed, complementary receiving slot 113A in the top housing portion 101A. While in this embodiment, the lower surface 102B of the top housing portion 101A (in this instance a disk) is planar, and fixed to the base housing portion 101B, top housing portion 101A may be non-fixed (e.g., removable). In alternate embodiments, e.g., as shown in FIG. 5A, lower surface 102B of top housing portion 101A may comprise one or more projections 118 that may reversibly engage one or more complementary receiving slots (e.g., one or more of the optional voids 114, 115, 116) of the base housing portion 101B to enhance stability while allowing for removability of the top housing portion 101A from the base housing portion 101B (e.g., for changing of the blade 112). In yet further embodiments, e.g., FIG. 5B, shows a bottom view of an alternative embodiment of the top housing portion 101A shown in FIG. 5A, showing six recesses 119 in the bottom surface 102B. The recesses may be configured to minimize material costs and/or facilitate manufacturing, may have e.g., flat or domed surfaces, and may extend a desired distance into the top housing portion 101A (e.g., up to about 50% into the top housing portion 101A).

Figure 3A:
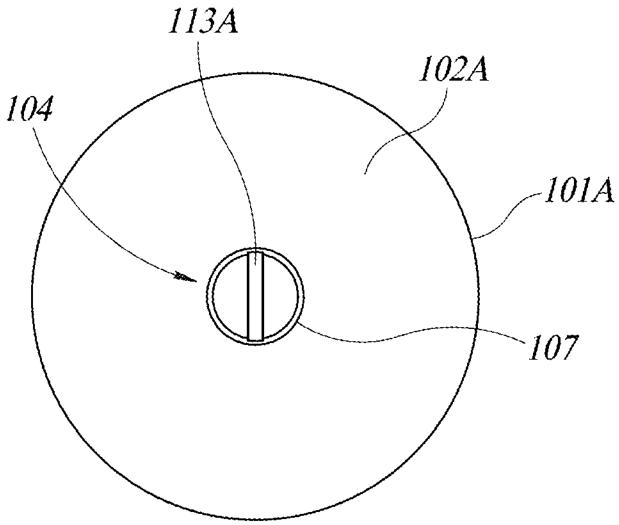
FIGS. 3A-3D show top (FIG. 3A), bottom (FIG. 3D), side (FIG. 3C), and side sectional (FIG. 3B) views of the housing top portion 101A disk of FIGS. 2A and 2B.
Figure 3B:
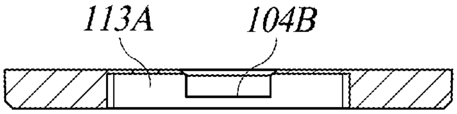
Figure 3C:
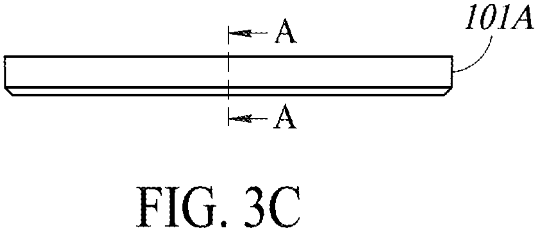
Figure 3D:
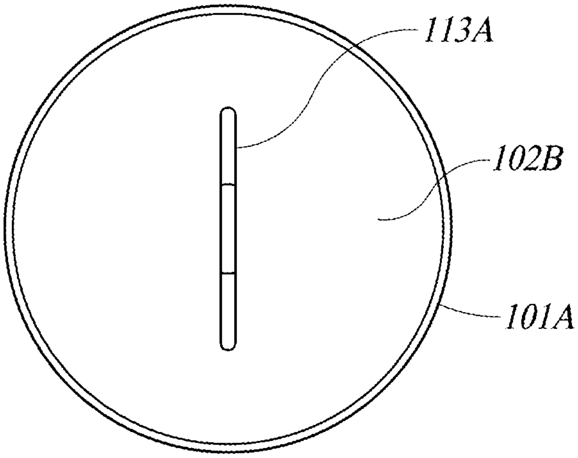

FIGS. 3A-3D show top (FIG. 3A), bottom (FIG. 3D), side (FIG. 3C), and side sectional (FIG. 3B) views of the housing top portion 101A disk of FIGS. 2A and 2B. As shown in FIG. 2B and FIG. 3A, the complementary receiving slot 113A bisects recess 104, extends horizontally beyond the recess 104, and extends vertically in this embodiment from a level just below the support surface 102A level (e.g., from a position within the bevel of margin 107) through the lower surface 102B of the housing top portion 101A, such that cylindrical wall of the recess 104 has a pair of opposed vertical slots (visible in FIG. 2B) extending perpendicularly from a position at or near (proximate to) support surface 102A (e.g., from a position within the bevel) to a lower, distal position near the bottom of recess 104. In this embodiment, the cylindrical walled recess 104 has a bottom 104B, and does not extend through the lower surface 102B of the housing top portion 101A, such that receiving slot 113A bisects the recess bottom 104B, to provide a U-shaped slot in the recess 104. Alternatively, the cylindrical wall recess 104 may extend through the lower surface 102B of the top housing 101A, In either case (recess 104 as a counter-bore or as a through-hole), configuring the opposed, complementary receiving slots 113A and 113B to extend horizontally beyond the recess 104 diameter 105, provides for secure anchoring and stabilization of the blade 112 within the top 101A and base 101B housing portions.

As will be apparent to one of ordinary skill in art, the precise dimensions of the elements/features of the above-described screwdriver embodiments can be tailored, depending on the particular size and design of the screws and collars of the desired/targeted screw assemblies, to provide for coordinated centering, support, and engagement of the particular assembly screws and collars. For example, in a preferred embodiment, the target collar is a shower screen of an espresso machine, and the dimensions of the centering, support plane screwdriver are configured as follows to provide for cooperative centering for removing and installing the shower screen and the shower screen assembly screw of a shower screen assembly of an espresso machine:

- Top housing 101A (diameter), 2.31 inches;
- Top housing 101A (thickness), 0.20 inches;
- Walled recess 104 (diameter), 0.51 inches;
- Base housing 101B (diameter, height of lower turning face section), 1.85, 0.58 inches;
- Base housing 101B (outer diameter, including integral lip 109), 2.60 inches;
- Base housing 101B (height including integral lip 109), 1.16 inches;
- Circumferential lip 109 (outer diameter), 2.60 inches;
- Circumferential lip 109 (inner diameter), 2.44 inches;
- Circumferential lip 109 (thickness), 0.16 inches;
- Circumferential lip 109 (height above support surface 102A), 0.25 inches;
- Metal Blade (tab) insert 112 (width, height), 1.18, 0.59 inches;
- Slot 113A (depth below support surface 102A), 0.010 inch; and
- Slot 113B (depth into base housing 101B), 0.40 inch.

A tool having the above-described dimensions are compatible for use, for example, on the shower screen assemblies of many espresso machines including, but not limited to La Marzocco, Synesso, Slayer, Modbar, Rancilio, Nuova Simonelli, and Cimbali. Shower screen assemblies having the following exemplary component dimensions:

- Shower screen (diameter) 2.281 inches; and
- Shower screen screw head (e.g., domed) (diameter): 0.400 inches, are manufactured, for example, by La Marzocco, IMS, Cimbali, Nuova Simonelli, and Rancilio.

METHODS

Additional aspects provide methods for installing or removing a shower screen assembly screw and shower screen of an espresso machine, comprising use of the screwdriver of any one of the embodiments described above and/or in clauses 1-24, to install or remove the screw, while supporting the shower screen on the support surface of the screwdriver.

Further aspects provide methods for installing or removing a shower screen assembly screw and shower screen of an espresso machine, comprising use of the screwdriver of any one of the embodiments described above and/or in clauses 26-34, to install or remove the screw, while supporting the shower screen on the support surface of the screwdriver.

In the methods, a user may initially hand position and center the screwdriver on the shower screen assembly screw and shower screen of an espresso machine. The user may then apply, by hand (or tool), a torquing force to the exterior turning face 108 positioned on the base housing portion 101B of the screwdriver to turn and remove and/or install the shower screen assembly screw, which along with the shower screen is retained in the walled recess 104 and/or on the support surface 102A of the top portion 101A of the retention housing. During application of the torquing force to the exterior turning face 108, the user may position a fingertip in the centered dish 115A at the bottom of the base housing portion 101B, to facilitate positioning and maintaining desired pressure on the screwdriver during removal and/or installation of the shower screen screw.

The invention claimed is:

1. A centering, support plane screwdriver, comprising:

a retention housing having a base portion connected to a top housing portion having an upper planar or substantially planar support surface, defined by an outer perimeter that conforms to the outer circumference of an espresso machine screw collar or shower screen, and surrounding a central cylindrical walled recess extending into the top housing portion from a circular recess margin at the support surface to a level below the support surface, the walled recess comprising an integral or non-integral screwdriver tip centered therein, wherein the support surface, the recess margin, the walled recess, and the screwdriver tip are configured to center, receive, and engage a shower screen screw head or a screwdriver tip engaging portion thereof within the walled recess, and to center, receive, and support the screw collar or the shower screen on the support surface; and an exterior turning face positioned on the retention housing, and configured to be in turning communication therewith upon application of a torquing force to the turning face, wherein the cylindrical wall of the walled recess has a pair of opposed vertical slots extending perpendicularly from a support surface-proximal position below the support surface to a support surface-distal position, and wherein the screwdriver tip comprises at least an upper edge portion of a screw head-engaging insert extending between and into the opposed vertical slots in the cylindrical wall of the recess.

2. The screwdriver of claim 1, wherein the screwdriver tip is positioned within the walled recess to be flush with or below the support surface level.

3. The screwdriver of claim 1, wherein the perimeter of the support surface is circular, and the support surface extends radially or substantially radially from the recess margin to the support surface perimeter.

4. The screwdriver of claim 1, wherein the walled recess is integral with the top housing portion and support surface.

5. The screwdriver of claim 1, wherein the support surface of the top housing portion comprises a support disk having upper and lower disk surfaces, wherein the walled recess extends partially or completely through the support disk, wherein the upper disk surface is the support surface, the lower disk surface is in contact with, and/or connected to, the base housing portion, and wherein the exterior turning face is connected to or integral with the base housing portion.

6. The screwdriver of claim 1, wherein the recess margin is beveled to a larger diameter d at the support surface.

7. The screwdriver of claim 1, wherein the recess margin is beveled, and wherein the support surface-proximal positions of the vertical slots are within the bevel below the support surface level.

8. The screwdriver of claim 1, wherein the walled recess extends partially through the support surface to a recess bottom having a recess bottom slot extending between the opposed vertical slots, to provide a U-shaped slot within the walled recess of the top housing portion.

9. The screwdriver of claim 8, wherein the screw head-engaging insert also extends into or through the recess bottom slot.

10. The screwdriver of claim 9, wherein a lower edge of the screw head-engaging insert additionally extends into a conforming slot in the base housing portion.

11. The screwdriver of claim 1, further comprising a circumferential lip positioned at the perimeter of the support surface and extending perpendicularly or substantially perpendicularly beyond the support surface in a direction opposite the cylindrical walled recess to define a recessed support surface, and wherein the circumferential lip is integral or non-integral with the top and/or base housing portions.

12. The screwdriver of claim 11, wherein the support surface and the circumferential lip are configured to sufficiently conform to the outer circumference of the screw collar or the shower screen to cooperate with the recess margin, the walled recess, and the screwdriver tip to center, receive, and engage the shower screen screw head or the screwdriver tip engaging portion thereof, within the walled recess, and to center, receive, and support the screw collar or the shower screen on the support surface.

13. The screwdriver of claim 12, wherein the circumferential lip is integral with the base housing portion, or integral with the top housing portion.

* * * * *